(12) United States Patent  (10) Patent No.: US 8,708,671 B2
Gregory et al.  (45) Date of Patent: Apr. 29, 2014

(54) CRANKED ROD PUMP APPARATUS AND METHOD

(75) Inventors: Benjamin J. Gregory, Racine, WI (US); Thomas L. Beck, Union Grove, WI (US); Ronald G. Peterson, Racine, WI (US); Michael A. MacDonald, Racine, WI (US); Michael D. Dry, Racine, WI (US)

(73) Assignee: Unico, Inc., Franksville, WI (US)

( * ) Notice: Subject to any disclaimer, the term of this patent is extended or adjusted under 35 U.S.C. 154(b) by 247 days.

(21) Appl. No.: 13/155,585

(22) Filed: Jun. 8, 2011

(65) Prior Publication Data

US 2011/0232283 A1  Sep. 29, 2011

Related U.S. Application Data

(63) Continuation-in-part of application No. 12/251,789, filed on Oct. 15, 2008, now Pat. No. 8,328,536.

(60) Provisional application No. 60/979,986, filed on Oct. 15, 2007.

(51) Int. Cl.
*F04B 35/04* (2006.01)

(52) U.S. Cl.
USPC ............................................. 417/411; 417/75

(58) Field of Classification Search
USPC ............... 417/411, 53, 45, 44.1, 75; 60/641.8
See application file for complete search history.

(56) References Cited

U.S. PATENT DOCUMENTS

| | | | |
|---|---|---|---|
| 2,551,434 A | 5/1951 | Gray et al. | |
| 3,741,686 A | 6/1973 | Smith | |
| 4,114,375 A | 9/1978 | Saruwatari | |
| 4,551,072 A | 11/1985 | Barall | |
| 4,631,918 A | 12/1986 | Rosman | |
| 4,644,256 A | 2/1987 | Farias et al. | |
| 4,788,873 A | 12/1988 | Laney | |
| 4,836,497 A | 6/1989 | Beeson | |
| 5,027,909 A | 7/1991 | Carter et al. | |
| 5,230,607 A | 7/1993 | Mann | |
| 5,832,727 A | 11/1998 | Stanley | |
| 6,015,271 A | 1/2000 | Boyer et al. | |
| 6,164,935 A | 12/2000 | Turiansky | |
| 6,275,403 B1 | 8/2001 | McNulty et al. | |
| 7,126,294 B2 | 10/2006 | Minami et al. | |
| 7,168,924 B2 | 1/2007 | Beck et al. | |

(Continued)

FOREIGN PATENT DOCUMENTS

| | | |
|---|---|---|
| JP | H05012669 | 2/1993 |
| JP | H07103136 | 4/1995 |

(Continued)

OTHER PUBLICATIONS

U.S. Appl. No. 11/761,484, filed Jun. 12, 2007, Beck et al.

*Primary Examiner* — Joseph L Williams
(74) *Attorney, Agent, or Firm* — Reinhart Boerner Van Deuren s.c.

(57) ABSTRACT

An improved apparatus and method are provided, for pumping fluids, such as water and/or hydrocarbons, from a subterranean formation or reservoir, through use of a cranked rod pumping (CRP) apparatus for imparting reciprocating substantially vertical motion to a rod of a sucker-rod pump having a pump stroke. The CRP apparatus includes a motor driven cranked mechanical actuator arrangement. The cranked mechanical actuator arrangement includes a substantially vertically moveable member attached to the rod of the sucker-rod pump for imparting and controlling vertical motion of the rod of the sucker-rod pump. The actuator arrangement may include pneumatic counterbalancing.

11 Claims, 14 Drawing Sheets

(56) References Cited

U.S. PATENT DOCUMENTS

| | | |
|---|---|---|
| 7,321,211 B2 | 1/2008 | Peterson |
| 7,635,022 B2 | 12/2009 | Han et al. |
| 2006/0067834 A1 | 3/2006 | Boyer et al. |
| 2006/0171821 A1 | 8/2006 | Brown |
| 2007/0098575 A1 | 5/2007 | Han et al. |
| 2007/0286750 A1 | 12/2007 | Beck et al. |

FOREIGN PATENT DOCUMENTS

| | | |
|---|---|---|
| JP | H11504408 | 4/1999 |
| JP | 2004028007 A | 1/2004 |
| JP | 2005054699 | 3/2005 |

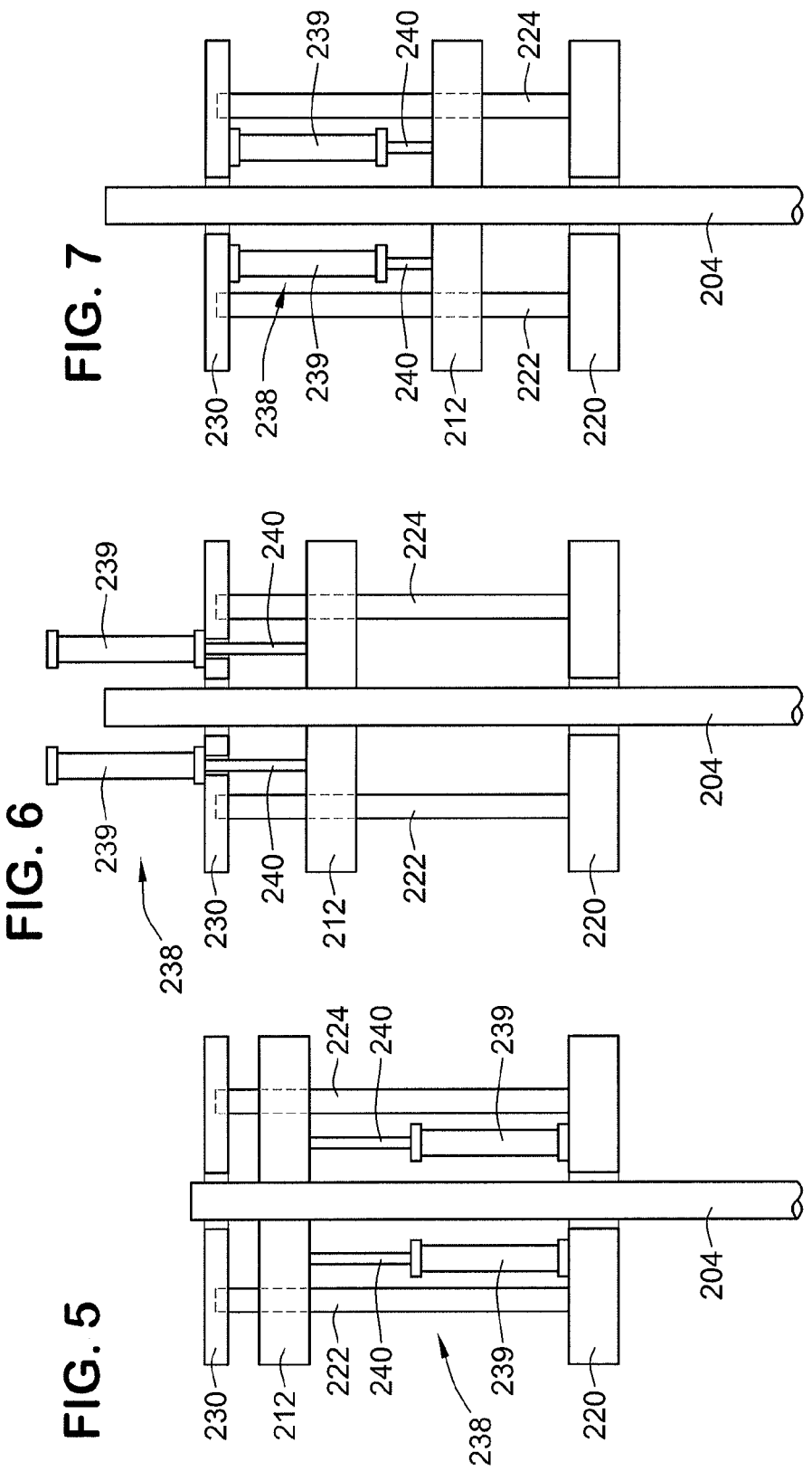

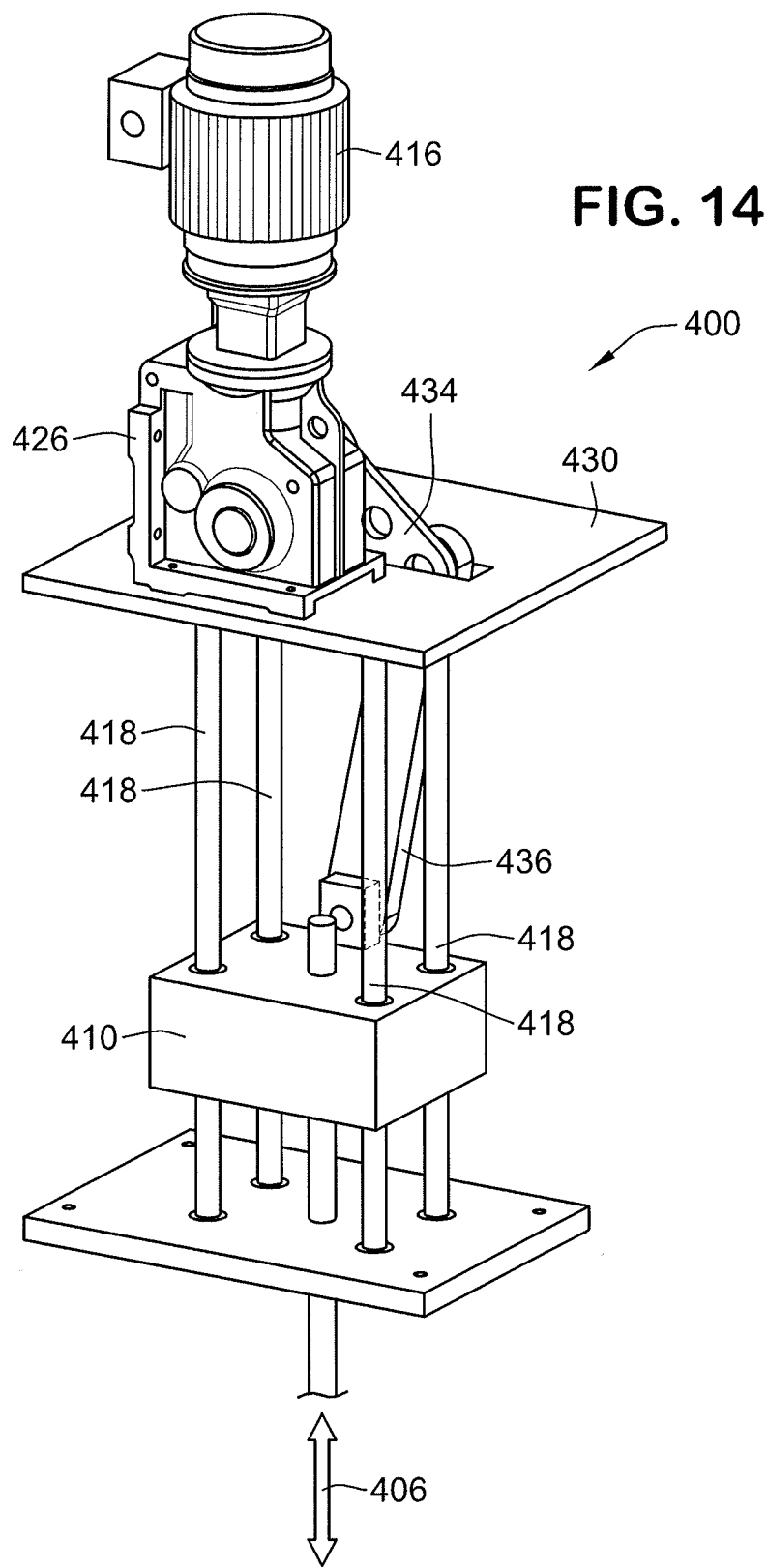

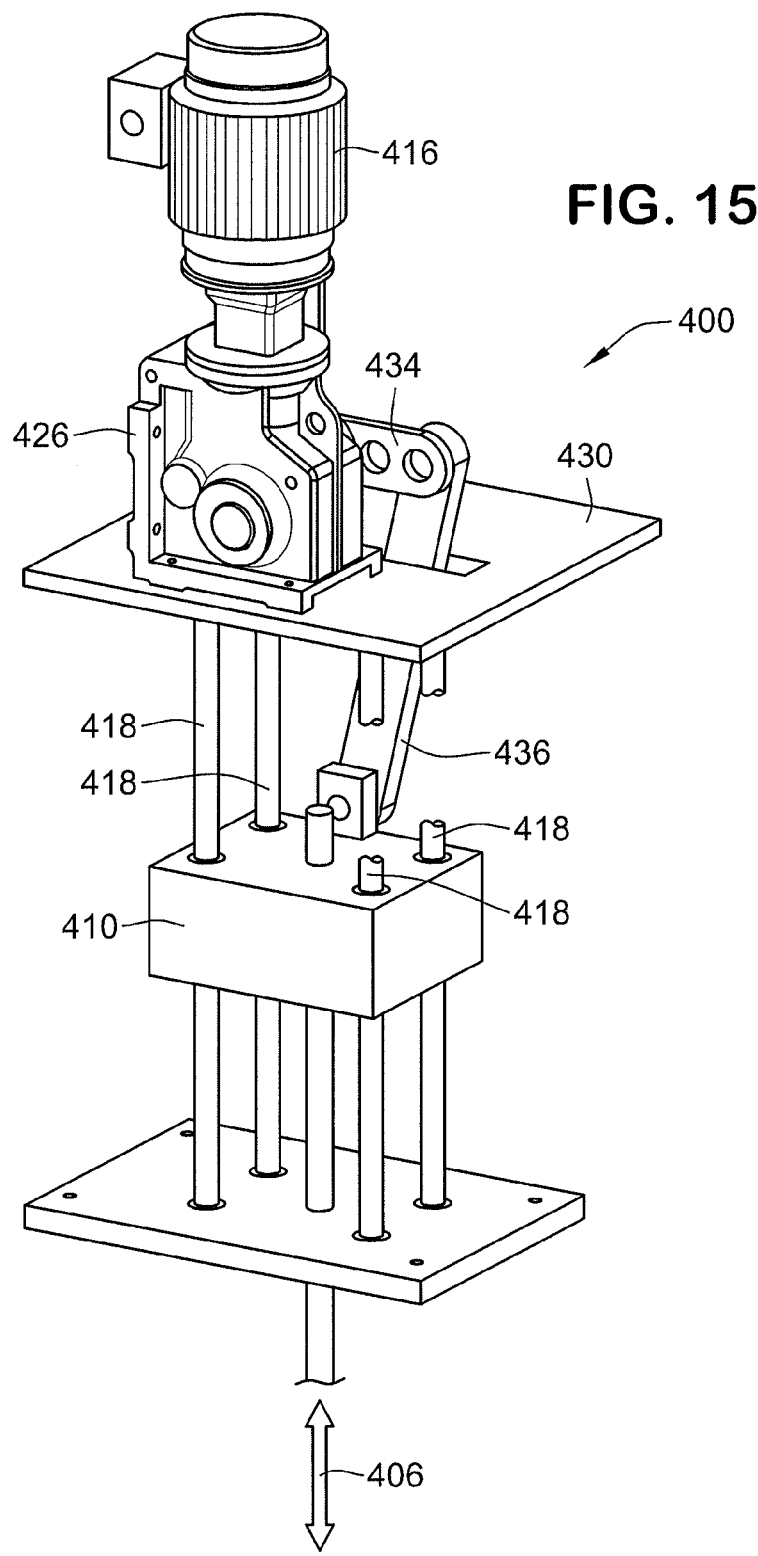

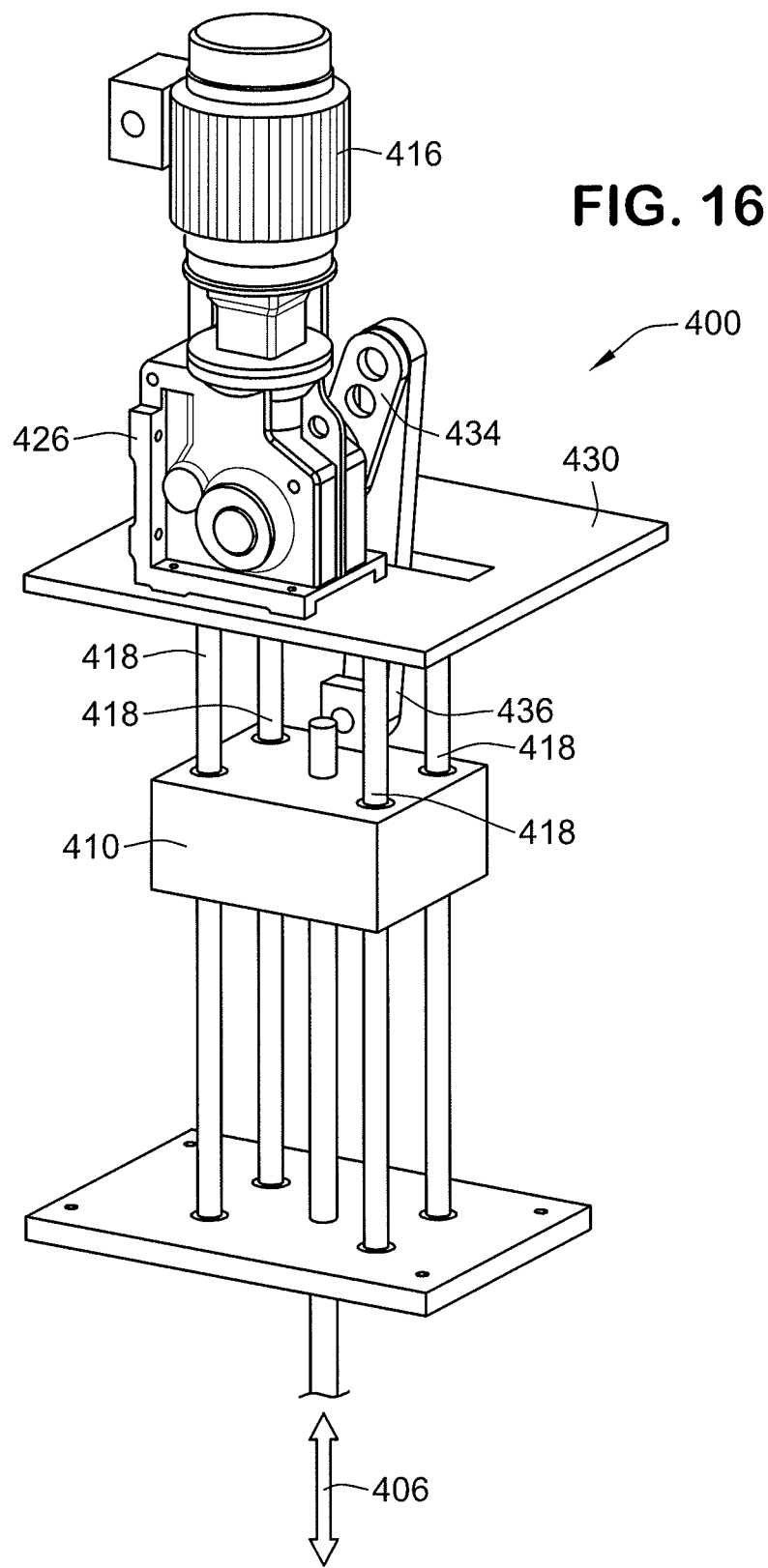

CRANKED ROD PUMP APPARATUS AND METHOD

CROSS-REFERENCE TO RELATED PATENT APPLICATIONS

This patent application is a continuation-in-part of co-pending U.S. patent application Ser. No. 12/251,789, filed Oct. 15, 2008, and claims the benefit of U.S. Provisional Patent Application No. 60/979,986, filed Oct. 15, 2007, the entire teachings and disclosures of which are incorporated herein by reference thereto.

FIELD OF THE INVENTION

This invention relates to pumping of fluids, such as water and/or hydrocarbons, from subterranean formations or reservoirs, and more particularly to a pumping apparatus and method for use in such pumping applications.

BACKGROUND OF THE INVENTION

For many years, the familiar "horsehead" walking-beam type mechanism has been used for pumping fluids such as water and/or oil from subterranean formations. As discussed at length in commonly assigned co-pending U.S. patent application Ser. No. 11/761,484, titled "Linear Rod Pump Apparatus And Method," by Beck et al., conventional walking beam apparatuses have a number of disadvantages, not the least of which is their large size. In addition, performance of the walking beam pump apparatus is largely a function of the design in connection of a number of mechanical parts, which include massive counter-weights and complex drive mechanisms which are difficult to control for obtaining maximum pumping efficiency or to compensate for changes in the condition of the well over time.

Also, for potential well sites in very remote locations, and particularly in locations without access to a power grid and no practical road access for regularly servicing a pumping apparatus or a motor generator, batteries, or other traditional stand-alone power source for a pumping apparatus, it has heretofore been impractical, and in some cases impossible, to utilize a conventional walking-beam apparatus or other known types of prior pumping apparatuses and methods. As a result, potentially valuable energy resources have remained untapped.

Although the linear rod pump apparatus and methods, disclosed in the above-referenced '484 to Beck, provide significant improvement over other prior pumping apparatuses and methods in many pumping applications, the continually reversing motor utilized in the linear rod pump apparatus and methods disclosed in Beck '484 may not be desirable in some pumping applications. For such applications, another type of apparatus and method which could operate without continually reversing the motor might prove to be more desirable.

It is particularly desirable to provide such an improved apparatus and method for pumping fluid from hydrocarbon wells, or other fluid reservoirs, which are located so remotely from any source of line power or access roads that the only convenient source of energy for powering the pumping apparatus in an unattended mode would be a solar array. It is particularly desirable, in this regard, for some applications to have the solar array be the sole source of power, without the need for reliance upon any back-up batteries or other capacitive energy storage.

BRIEF SUMMARY OF THE INVENTION

The invention provides an improved apparatus and method for pumping fluids, such as water and/or hydrocarbons, from a subterranean formation or reservoir, through use of a cranked rod pumping (CRP) apparatus for imparting reciprocating substantially vertical motion to a rod of a sucker-rod pump having a pump stroke. A CRP apparatus, according to the invention, includes a motor driven cranked mechanical actuator arrangement. The cranked mechanical actuator arrangement includes a substantially vertically moveable member attached to the rod of the sucker-rod pump for imparting and controlling vertical motion of the rod of the sucker-rod pump.

The cranked mechanical actuator arrangement may include a frame having a base thereof which is adapted for attachment to the wellhead of the well. The frame further includes at least two linear guide rails extending vertically upwardly from the base when the base is attached to the wellhead. The vertically moveable member is slideably mounted on the linear guides and constrained by the guides for substantially linear reciprocating vertical movement along the guides.

In some forms of the invention, the cranked mechanical actuator arrangement may further include a crank element and an articulating link element. The crank element is operatively coupled at a first attachment point thereof to the rotatable element of the motor for rotation in a fixed drive ratio with the rotatable element of the motor. In some forms of the invention, the mechanical actuator arrangement may also include a drive arrangement operatively connect between the rotatable element of the motor in the first attachment point of the crank element, such that the crank element rotates at a different speed than the rotatable element of the motor in a fixed drive ratio. The articulating link of the cranked mechanical actuator arrangement may have first and second attachments thereof, disposed at a spaced relationship from one another along the articulating link element. The first attachment point of the articulating link element may be pivotably joined to the crank element at a second attachment point of the cranked element, with the second attachment point of the cranked element being spaced eccentrically, radially outward from the first attachment point of the cranked element. The second attachment point of the articulating link element may be pivotably attached to the vertically moveable member.

In some forms of the invention, at least one of the cranked element and/or the articulating link element may further include an additional attachment point for changing the stroke of the vertically moveable member along the guides, to thereby change the pump stroke. The motor and/or the drive apparatus may be mounted on the base of the frame.

In some forms of the invention, the cranked rod mechanical actuator may further include a pneumatic counterbalance arrangement operatively connected between the frame and the vertically moveable member. The pneumatic counterbalance arrangement may include at least one pneumatic cylinder that is operatively connected between the base and the vertically moveable member, for storing energy during a portion of the downward stroke of the vertically moveable member and for releasing the stored energy during a portion of a subsequent upward stroke of the vertically moveable member. In some forms of the invention, at least one pneumatic cylinder may be disposed between the vertically moveable member and the base, to thereby provide a physically compact apparatus, and to more advantageously align the pneumatic cylinder to apply force between the vertically moveable member in the base in a direct rather than an offset manner.

In some forms of the invention, the articulating link element may be configured to include an offset section thereof, to thereby enhance alignment of various moving parts of the CRP apparatus with one another.

In some forms of a CRP apparatus, according to the invention, the motor and/or gearbox are disposed on one side of one or more linear guide rails extending vertically upward from the base of the frame, and the vertically movable member being slidingly disposed on an opposite side of the one or more linear guide rails. The crank element and the articulating link element have respective lengths thereof, and the vertical location of the first attachment point of the crank element above the base of the frame is cooperatively selected so that the vertically movable member is constrained to always hang below the first attachment point of the articulating link in any angular position of the crank element, during operation of the CRP apparatus, in such a manner that gravitational force will cause the vertically movable member to be slidingly held in contact with the one or more linear guide rails as the motor is controlled to impart reciprocating motion to the vertically movable member along the one or more linear guide rails.

The invention may also take the form of a method for constructing, installing, operating, replacing, and/or maintaining a CRP apparatus in accordance with the invention. In one form of the invention, a method is provided for extending the life of a hydrocarbon well having a walking beam apparatus operatively connected thereto for imparting reciprocating substantially vertical motion to a rod of a sucker-rod pump having a stroke disposed in the well, by disconnecting the rod from the walking-beam apparatus and operatively connecting the rod to a CRP apparatus according to the invention.

A method for replacing a walking beam apparatus with a CRP apparatus, according to the invention, may further include operating the CRP apparatus at a slower stroke rate than the stroke rate of the walking beam pump prior to its replacement by the CRP apparatus. The method, according to the invention, may include mounting the CRP apparatus directly on a wellhead of the well, to thereby preclude the need for a separate mounting structure for the CRP apparatus. A method, according to the invention, may also include leaving the walking beam apparatus in place adjacent to the well, after installation of the CRP apparatus.

A CRP apparatus, according to the invention, may also include a motor drive and controller for operating the motor in a substantially constant input power operational mode. The CRP apparatus may be configured to include substantially no electrical power storage elements. In some cases, where the inertia of the rotatable element of the motor is insufficient to maintain a constant input power without excessive speed variations, additional inertia may be added to rotatable element of the motor.

A CRP apparatus or method, according to the invention, may include operatively coupling a solar energy power source to a CRP apparatus, according to the invention, for providing some or all of the power for driving the motor. In some forms of the invention, the CRP solar energy power source is the sole source of power for driving the motor, such that the CRP apparatus only pumps when the solar energy power source is producing sufficient power to drive the motor. Those having skill in the art will recognize that the capability of the invention to be practiced solely with a solar energy power source without the need for any electrical power storage elements, makes apparatuses and methods, according to the invention, particularly desirable for use in remote locations having little or no access to power lines or maintenance roads.

The invention may also take the form of a method for pumping fluid from a source of fluid located in a remote location, by operatively attaching a CRP apparatus, according to the invention, to the source of the fluid. The method may further include attaching the CRP apparatus to a stand-alone source of power, such as an engine driven generator, a battery, or a solar collecting array. In some forms of the invention, the stand-alone source of power is a solar energy power source.

Some forms of a method, according to the invention, may further include providing the source of fluid at the remote location. Where the source of fluid at the remote location is a fluid well, a method according to the invention may further include providing the fluid well through steps such as drilling the well, and/or uncapping an existing abandoned well.

Other aspects, objects and advantages of the invention will be apparent from the following detailed description of the accompanying drawings, photographs and other attachments.

BRIEF DESCRIPTION OF THE DRAWINGS AND ATTACHMENTS

The accompanying drawings and attachments incorporated in and forming a part of the specification illustrate several aspects of the present invention and, together with the description, serve to explain the principles of the invention.

FIG. 1 is a schematic illustration of a first exemplary embodiment of a crank rod pumping apparatus (CRP), according to the invention, mounted to the wellhead of a hydrocarbon well.

FIG. 2 is a schematic illustration of the first exemplary embodiment of the CRP pumping apparatus, according to the invention, mounted on the wellhead of the well shown in FIG. 1, and operatively connected for pumping fluid from the well, instead of the walking beam apparatus, with the CRP pumping apparatus and walking beam pumping apparatus being drawn to the same scale to illustrate the substantial reduction in size and complexity of the CRP pumping apparatus, according to the invention, as compared to the walking beam apparatus which was providing similar pumping output.

FIGS. 5-7 are schematic illustrations of the construction of several alternate embodiments of a pneumatic counterbalance arrangement, according to the invention.

FIGS. 14-16 are perspective illustrations of a fourth exemplary embodiment of a cranked rod pumping apparatus, according to the invention.

While the invention will be described in connection with certain preferred embodiments, there is no intent to limit it to those embodiments. On the contrary, the intent is to cover all alternatives, modifications and equivalents as included within the spirit and scope of the invention.

DETAILED DESCRIPTION OF THE INVENTION

Figure 1:
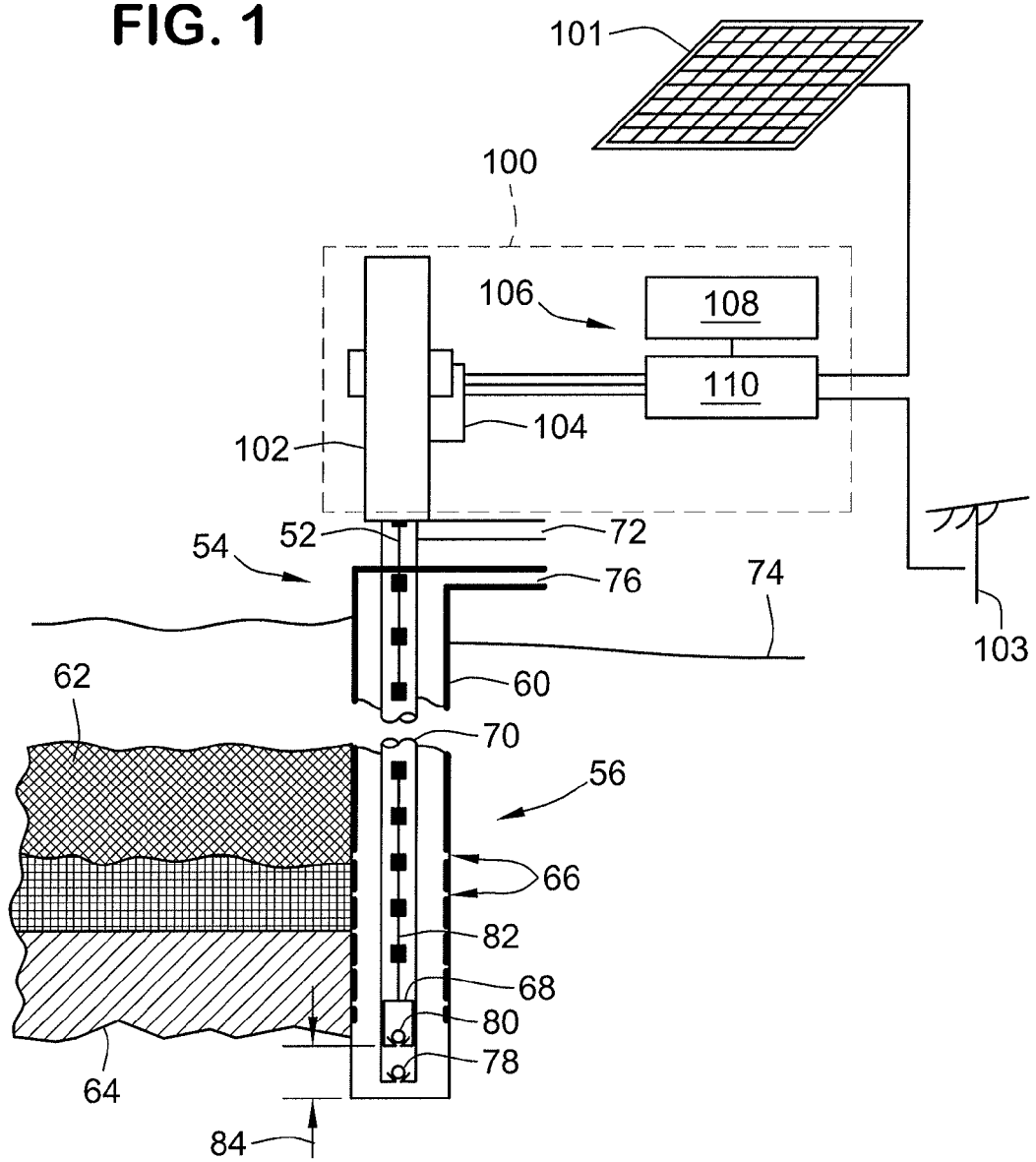

FIG. 1 is a schematic illustration showing an embodiment of a cranked rod pump (CRP) apparatus 100 attached to a wellhead of a hydrocarbon well. As shown in FIG. 1, the invention may be practiced with a variety of power sources including a solar array 101 or through attachment to a conventional power grid 103.

Figure 2:
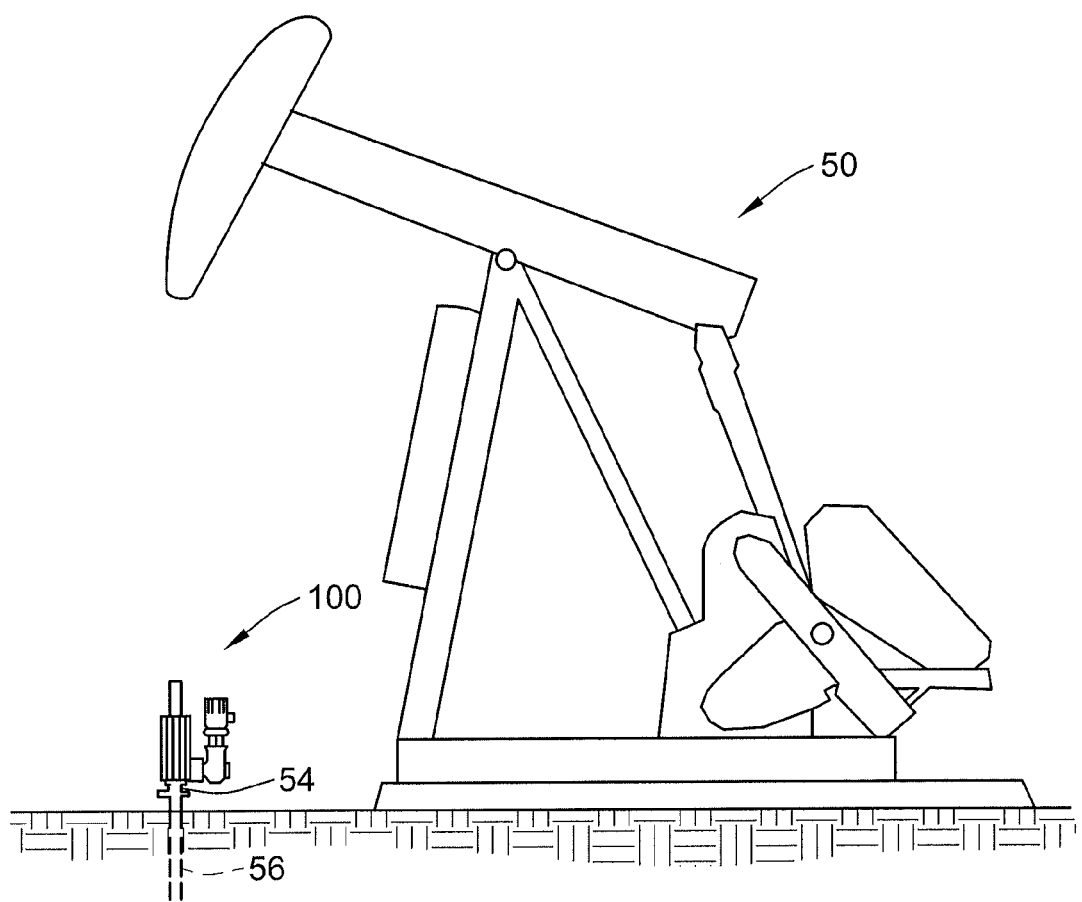

FIG. 2 illustrates the manner in which a CRP apparatus 100, according to the invention, may be utilized to great advantage for replacing a conventional walking beam pumping apparatus 50. In FIG. 2, the cranked rod pumping apparatus 100 is mounted on the well head 54 of a hydrocarbon well 56.

Returning to FIG. 1, the well includes a casing 60 which extends downward into the ground through a subterranean formation 62 to a depth sufficient to reach an oil reservoir 64. The casing 60 includes a series of perforations 66, through which fluid from the hydrocarbon reservoir enter into the casing 60, to thereby provide a source of fluid for a down-hole pumping apparatus 68, installed at the bottom of a length of tubing 70 which terminates in an fluid outlet 72 at a point above the surface 74 of the ground. The casing 60 terminates in a gas outlet 76 above the surface of the ground 74.

The down-hole pumping apparatus 68 includes a stationary valve 78, and a traveling valve 80. The traveling valve 80 is attached to a rod string 82 extending upward through the tubing 70 and exiting the well head 54 at the polished rod 52. Those having skill in the art will recognize that the down-hole pumping apparatus 68, in the exemplary embodiment of the invention, forms a traditional sucker-rod pump arrangement for lifting fluid from the bottom of the well 56 as the polished rod 52 imparts reciprocal motion to rod string 82 and the rod string 82 in turn causes reciprocal motion of the traveling valve 80 through a pump stroke 84. In a typical hydrocarbon well, the rod string 82 may be several thousand feet long and the pump stroke 84 may be several feet long.

As shown in FIG. 1, the first exemplary embodiment of a cranked rod pump apparatus 100, according to the invention, includes a cranked mechanical actuator arrangement 102, a motor 104, and a control arrangement 106, with the control arrangement 106 including a controller 108 and a motor drive 110. A controller and/or motor drive, according to the invention, may take a variety of forms and include some or all of the apparatuses and methods disclosed in commonly assigned: U.S. Pat. No. 7,168,924 B2, to Beck et al., titled "Rod Pump Control System Including Parameter Estimator"; and co-pending, U.S. patent application Ser. No. 11/380,861, titled "Power Variation Control System for Cyclic Loads," to Peterson. The disclosures, teachings and suggestions of the Beck '924 patent and the Peterson '861 patent application are incorporated herein in their entireties by reference.

In all forms of the invention, the velocity and torque of the motor are calculated from measurements of motor voltages and currents. Crank velocity and torque are calculated allowing for the ratio of the gear box. Position of the crank is determined by integrating the crank velocity starting from a known reference position. The reference may be determined from a reference switch or by analyzing the pattern of the crank torque throughout the rotation of the crank. Estimating the reference point takes advantage of the fact that the loads on the crank at the top and bottom of stroke are approximately zero and that these two points are 180 degrees apart. Therefore, points in the crank rotation that have approximately zero load, but are not 180 degrees separated from a similar point may be ignored. The position of the rod is determined by the position of the crank and the geometry of the CRP apparatus.

Figure 3:
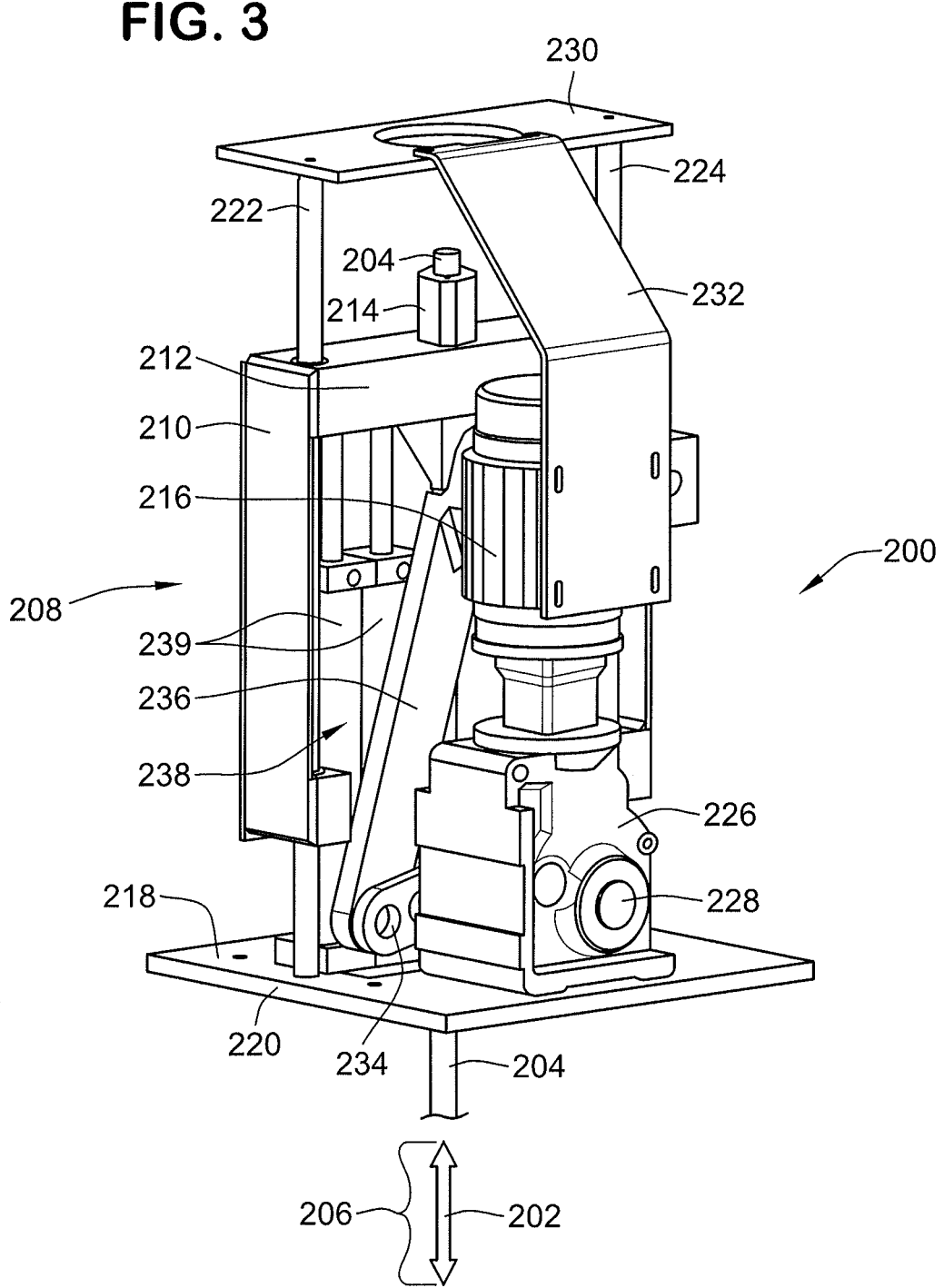
FIGS. 3 and 4 are perspective illustrations of a second exemplary embodiment of a CRP apparatus, according to the invention.
Figure 4:
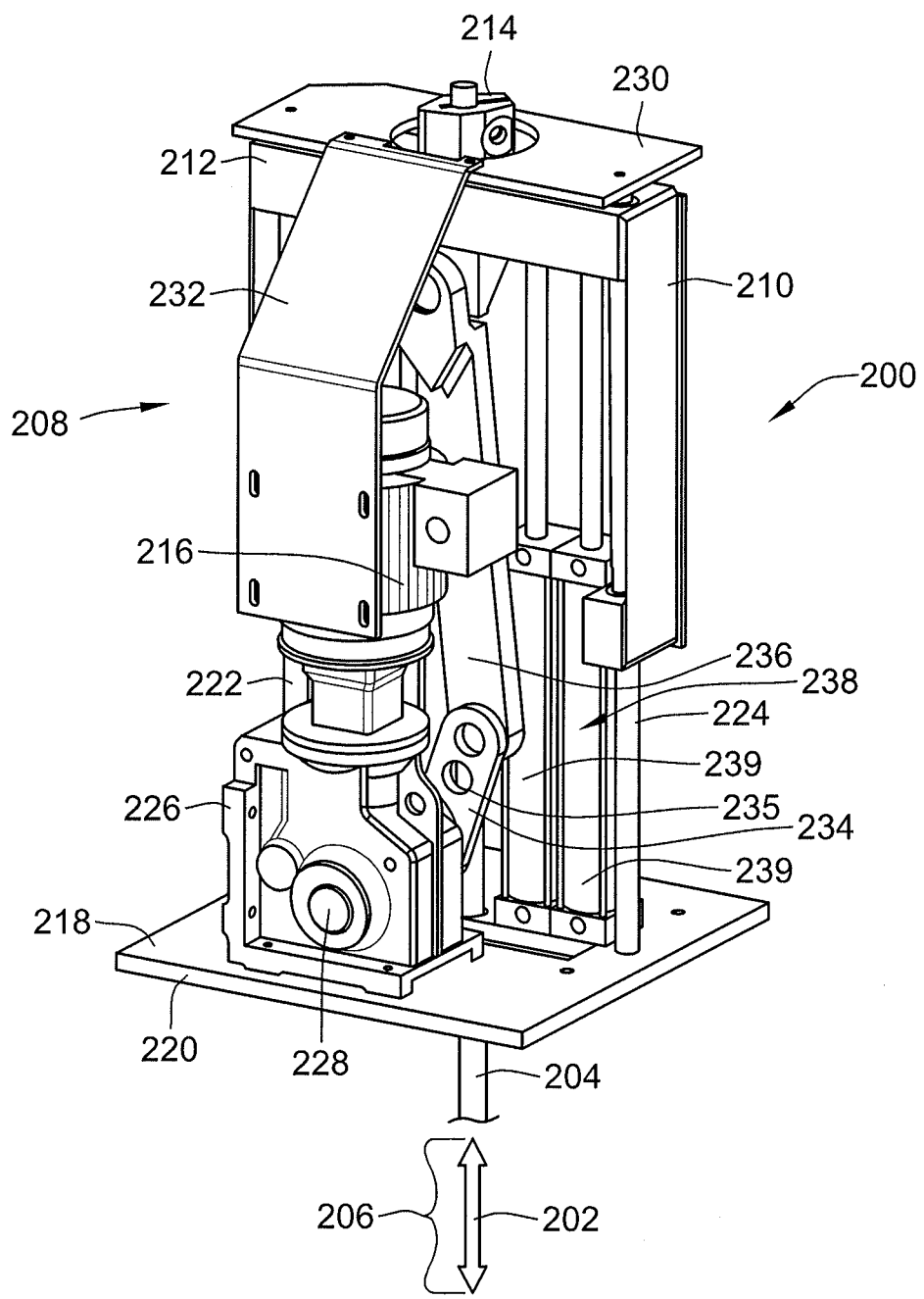

FIGS. 3 and 4 illustrate a second exemplary embodiment of a CRP apparatus 200, for imparting reciprocating substantially vertical motion, as indicated by arrow 202 to a rod 204 of a sucker-rod pump, such as the one illustrated as 100 in FIG. 1, having a pump stroke 206. The exemplary embodiment of the CRP apparatus 200 includes a cranked mechanical actuator arrangement 208 having a substantially vertically moveable member 210 attached to the rod 204 of the sucker-rod pump for imparting and controlling vertical motion of the rod 204 of the sucker-rod pump. Specifically, in the exemplary embodiment 200, the rod 204 passes through a through-hole (not shown) in an upper crossbar 212 of the vertically moveable member 210, and is secured to the vertically moveable member 210 by a clamp 214 which grips the rod 204 above the vertically moveable member 210.

The first exemplary embodiment of the CRP apparatus 200 also includes a motor 216 having a rotatable element (not shown) thereof operatively connected in a manner described in more detail below to the substantially vertically moveable member 210 of the linear actuator arrangement 208.

As shown in FIGS. 3 and 4, the crank mechanical actuator arrangement 208 in the exemplary embodiment 200 of the invention includes a frame 218, having a base 220 adapted for attachment to the wellhead of a well, and two linear guide rails 222, 224 which extend vertically upward from the base 220, when the base 220 is attached to wellhead. The vertically moveable member 210 is slideably mounted, by linear bearings (not shown) on the linear guides 222, 224 and constrained by the guides 222, 224 for substantially linear reciprocating vertical movement along the guides 222, 224 in the manner illustrated in FIGS. 3 and 4.

As shown in FIGS. 3 and 4, the exemplary embodiment of the crank mechanical actuator arrangement 208 in the exemplary embodiment of the CRP apparatus 200 includes a drive arrangement, in the form of a right angle gear box 226, which is mounted on the base 220. The rotatable element of the motor 216 is attached to a vertically oriented input (not shown) of the gear box 226, and converted to motion of a horizontally oriented output shaft 228 of the gear box 226 by a gear train (not shown) within the gear box 226. In this manner, the rotatable element of the motor 216 is operatively coupled in a fixed-ratio drive arrangement to the output shaft 228 of the gear box. It will be further seen from FIGS. 3 and 4 that the upper ends of the guides 222, 224 are joined by an upper frame cross member 230, and that the frame 218 further includes a motor mounting bracket 232 which extends downward from the upper frame cross member 230 to provide support for the motor 216 in its vertically oriented position atop the gear box 226.

As further shown in FIGS. 3 and 4, the crank mechanical actuator arrangement 208 of the first exemplary embodiment 200 includes a crank element 234 and an articulating link element 236. As will be understood from FIGS. 3 and 4, the crank element 234 is operatively coupled at a first attachment point thereof to the rotatable element of the motor 216, by virtue of the above-described attachment of the motor 216 to the gear box 226, attachment of the first attachment point of the crank element to the output shaft 228 of the gear box 226, such that the crank element 234 rotates in a fixed drive ratio with the rotatable element of the motor 216.

The articulating link element 236 has first and second attachment points thereof, disposed at a spaced relationship from one another along the articulating link element 236. The first attachment point of the articulating link element 234 is pivotably joined to the crank element 234 at a second attachment point of the crank element 234 which is spaced eccentrically and radially outward from the first attachment point of the cranked element 234. The second attachment point of the articulating link element is pivotably attached to the vertically moveable member 210.

Those having skill in the art will recognize that, by virtue of the above-described arrangement, as the motor 216 drives the output shaft of the gear box 226, the crank element rotates with the output shaft of the gear box, passing on part of each stroke through a slot in the base 220 and causes the articulating link element 236 to drive the vertically moveable member 210 up and down along the guides 222, 224 to thereby impart the reciprocating pump stroke to the rod 204.

As will be noted from an examination of FIG. 4, the crank element 234, in the exemplary embodiment 200, is essentially a lever having an additional attachment point 235 for the articulating link element 236, so that the stroke length 206 may be varied by changing the attachment point to the crank element 234. It will be further noted, by those having skill in the art, that although a simple lever-like configuration was selected for use in the exemplary embodiment 200, in other embodiments of the invention, the crank element 234 may have other shapes, such as triangular, square, or circular, and may also include additional attachment points to provide for a wider selection of stroke lengths. It will be yet further noted, that, in other embodiments of the invention, the articulating link element 236 may also have additional attachment points for use in adjusting stroke length.

As shown in FIGS. 3 and 4, the cranked rod mechanical actuator 208 of the exemplary embodiment of the CRP apparatus 200 also includes a pneumatic counterbalance arrangement 238, which includes four pneumatic cylinders 239 operatively connected between the frame 218 and the vertically moveable member 210, in addition to other components which are operatively connected in a suitable manner, such as those described in greater detail below hereto. As will be understood, from a review of the drawings and description given herein, the exemplary embodiment pneumatic counterbalance arrangement 238 in the CRP apparatus 200 includes several pneumatic cylinders 239 operatively connected between the base 220 and the vertically moveable member 210 for storing energy during a portion of the downward stroke of the vertically moveable member 210, and for releasing the stored energy during a portion of a subsequent upward stroke of the vertically moveable member 210. Addition of the pneumatic counterbalance arrangement 238 results in the lifting force available from the CRP apparatus being increased substantially over the lifting capacity of a CRP apparatus, according to the invention, which does not include the pneumatic counterbalance arrangement 238.

In some cases, the available power, due to limitations in the power source, electronic drive rating or mechanical limitations of the apparatus, may not be sufficient to rotate the crank from a fully lowered, stationary position through a full rotation. In those cases, the crank is rotated in a first direction until the rotational speed of the motor decreases, due to loading, below some threshold. At this time, rotational direction is reversed to command torque in the second, opposite direction. During each iteration of this rocking action, energy is stored in the lifted mass of the rod string, pump and fluid column. This energy is then returned to the kinetic energy of the pump mechanism or into the pressurization of the pneumatic counterbalance system as the lifted mass is lowered. In this way, the crank pump mechanism will achieve greater and greater speed and inertia and/or the counterbalance will support more and more of the weight of the fluid column, rod string and downhole pump mechanism each time it passes through the fully lowered position, until the combined inertia, counterbalancing and available power are sufficient to rotate the mechanism through a full cycle. From this point the mechanism continues in a single rotational direction.

FIG. 5 is a schematic illustration of a portion of the CRP apparatus 200, illustrating the placement of a pair of pneumatic cylinders 239 of the pneumatic counterbalance arrangement 238 configured as shown and discussed above with regard to FIGS. 3 and 4. Specifically, in the configuration shown in FIGS. 3-5, the rod 240 of the cylinders 239 is operatively attached to the upper crossbar 212, and the base of the cylinders 239 is attached to the base 220 of the frame 218. Those having skill in the art will recognize, however, that a pneumatic counterbalance arrangement according to the invention may take a variety of other forms, such as those illustrated schematically in FIG. 6 and FIG. 7. In FIG. 7, the cylinders 239 are mounted on the upper frame cross member 230 with the rods 240 of the cylinders 239 extending downward into operative contact with the upper crossbar 212. FIG. 7 illustrates an alternate placement of the cylinders 239 between the upper frame cross member and the moveable upper crossbar 212.

It is contemplated that, in addition to alternate mounting arrangements for the pneumatic cylinders 239, the number of cylinders utilized in any given application may also be greater or less than that shown in FIGS. 3-7, in various embodiments of the invention. It is also contemplated that it will generally be advantageous to have a working axis of the cylinders 239 aligned as closely as possible with the polished rod 204, so that the counterbalance forces generated by the cylinders are operatively transmitted as directly as possible to the polished rod 204.

Figure 8:
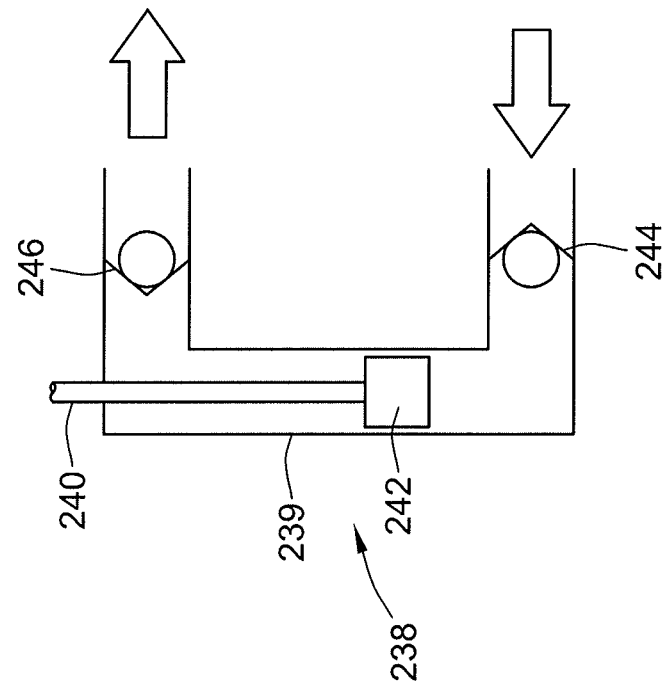
FIGS. 8-10 are schematic illustrations showing additional construction details and demonstrating the operation of several alternate embodiments of pneumatic counterbalance arrangements, according to the invention.
Figure 9:
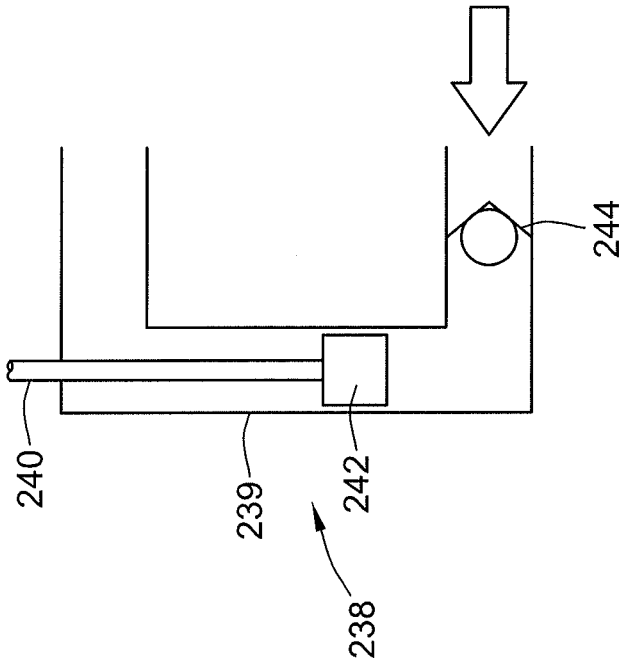
Figure 10:
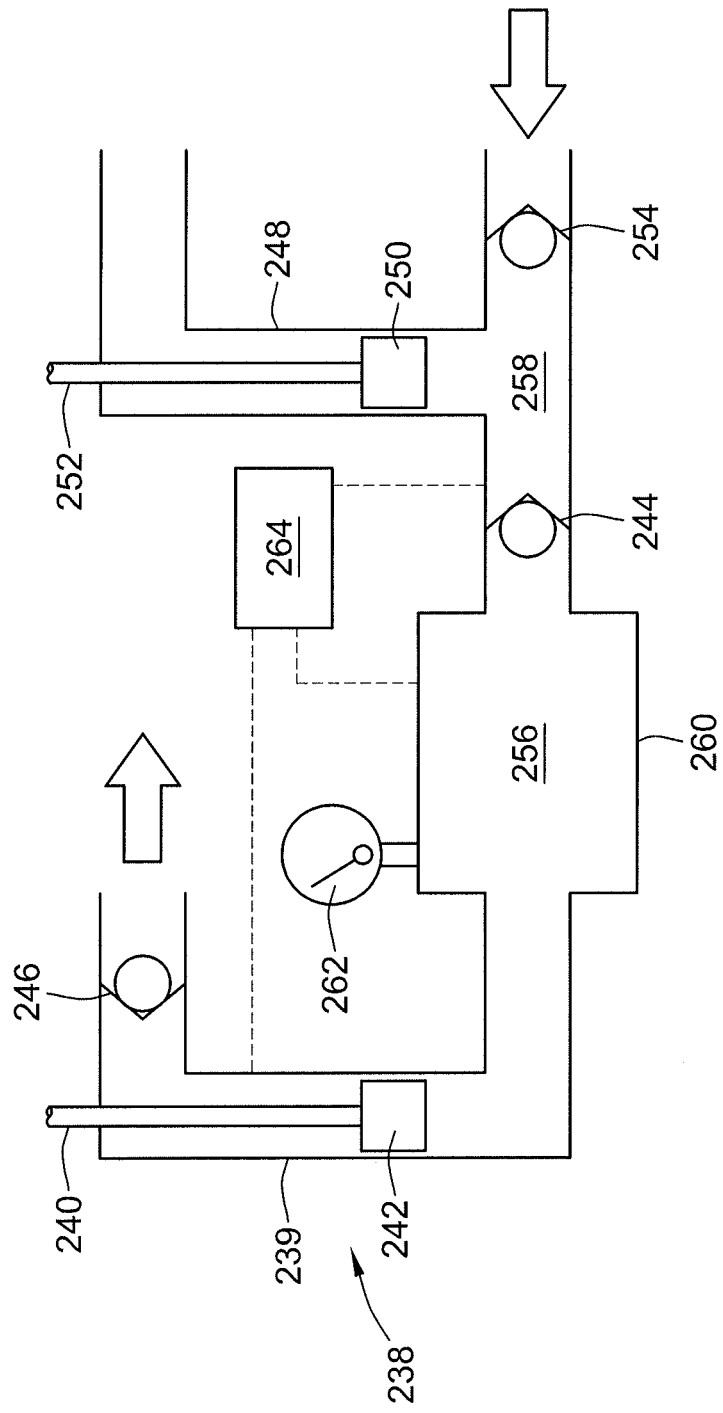

FIGS. 8-10 are schematic illustrations of several alternate embodiments of a pneumatic counterbalance arrangement 238, according to the invention. It will be recognized that the embodiments shown in FIGS. 8-10 are illustrative of the general principles of construction and operation of a pneumatic counterbalance arrangement according to the invention but are by no means intended to be limiting. Those having skill in the art will recognize that there are many other ways of constructing and operating a pneumatic counterbalance arrangement within the contemplated scope of the invention. It is further noted that the embodiments shown in FIGS. 8-10 all operate on a "bootstrap" principle, in which air is drawn into the cylinder 239 and trapped in a volume below a piston 242 of the cylinder 239 by virtue of reciprocating movements imparted to the rod 240 of the cylinder 239 by upward movement of the upper crossbar 212 in combination with the operation of an inlet check valve 244. Repetitive cycling of the piston 242 up and down results in a counterbalance pressure being built up on the cylinder 239 below the piston which then exerts an upward force on the piston 242 which is transmitted through the rod 240 as an upward counterbalancing force against downward movement of the upper crossbar 212. This resultant counterbalancing force acts against the weight of the rod and pumping mechanism on the downward stroke of the pump and further acts to assist the CRP apparatus in pulling the rod 204 upward on a successive stroke.

In the embodiment shown in FIG. 8, as the rod 240 pulls the piston 242 upward on an upward stroke of the CRP apparatus 200, the inlet check valve 244 opens and allows a flow of air into the cylinder 239 in a lower chamber having a volume defined by the space between the piston 242 and the inlet check valve 244. When the piston 242 reaches the top of its stroke and begins to move downward on its downward stroke, the check valve 244 closes and traps the ingested air between the piston 242 and the inlet check valve 244. As the piston 242 continues to move downward, the space between the piston 242 and the inlet check valve 244 becomes smaller, which causes the pressure of the air trapped between the piston 242 and the inlet check valve 244 to increase. This increase in pressure results in a storage of energy which is then released on the successive upstroke as the piston 242 moves upward to thereby generate the counterbalancing force aiding the CRP apparatus in raising the rod 204 on its upstroke. As a practical matter, with the arrangement shown in FIG. 8 it may take a rocking action as described above to allow the pressure between the piston 242 and the check valve 244 at the bottom of the pump stroke 206 to "bootstrap" up to a maximum working value. The inlet check valve 244 will continuously open to replenish any air leaking past the piston 242 during operation of the CRP apparatus. In the embodiment of FIG. 8, the cylinder 239 may be either a single acting or a double acting cylinder.

The exemplary embodiment of the pneumatic counterbalance arrangement 238 shown in FIG. 9 is essentially identical to the embodiment shown in FIG. 8 and described above, with the exception that in the embodiment of FIG. 9 the pneumatic counterbalance arrangement 238 also includes an outlet check valve 246 and the cylinder 239 is a double acting cylinder. Operation of the embodiment shown in FIG. 9 is essentially the same as operation of the previously described embodiment of FIG. 8, with the exception of the action of the outlet check valve 246. As will be understood from an examination of FIG. 9, whereas the inlet check valve 244 is configured to allow air to be drawn into the cylinder 239 as the piston moves upward and to close and trap air between the piston 242 and the inlet check valve 244 on the downward stroke of the piston, the outlet check valve 246 is configured to allow air to exit the space between the piston 242 and the outlet check valve 246 as the piston 242 moves upward, and prevent entry back into the space between the piston 242 and the outlet check valve 246 as the piston 242 moves downward. By virtue of this arrangement, as the piston 242 is reciprocated within the cylinder 239, in addition to pressure being built up in the space below the piston 242 pressure above the piston 242 is reduced below atmospheric as the piston 242 is forced downward by the action of the upper crossbar 212 on the piston rod 240. This arrangement provides an advantage in that the embodiment of FIG. 9 generates a greater pressure differential and resultant counterbalancing force across the piston 242 than is generated in the embodiment shown in FIG. 8.

FIG. 10 illustrates yet another alternate embodiment of a pneumatic counterbalance arrangement 238, according to the invention. In simple terms, the embodiment shown in FIG. 10 combines a cylinder 239 having inlet and outlet check valves 244, 246 arranged in operating as described above with regard to the embodiment of FIG. 9, with an additional pumping cylinder 248 having a configuration and operation similar to that described above with regard to the embodiment of FIG. 8.

The pumping cylinder 248 includes a piston 250 driven by a piston rod 252 which is operatively connected to the upper crossbar 212 to operate substantially in a parallel manner to the piston rod 240 of the piston 239. A second inlet check valve 254 is provided to allow air to be drawn into both the cylinder 248 and the cylinder 239 beneath their respective pistons 250 and 242 on a first upstroke of the CRP apparatus 200. On subsequent upstrokes, the pressure in reservoir cavity 256 would exceed the pressure in pumping cavity 258, causing check valve 244 to remain closed. On a downward stroke of the CRP apparatus 200, the pistons 242 and 250 compress the air in the pumping cavity 258 and the reservoir cavity 256. As the air in the pumping cavity 258 compresses, it will exceed atmospheric pressure, causing inlet check valve 254 to close. The air in the pumping cavity 258 will continue to compress and, due to its relatively smaller volume, will compress to a higher pressure than the air in the reservoir cavity 256. When this occurs, check valve 244 will open and allow the higher pressure air to enter the reservoir cavity 256. As the CRP apparatus 200 reciprocates, the reciprocal motion of the pistons 242 and 250 results in pressure above atmospheric being built up in the reservoir cavity 256. By raising the pressure at the inlet to the first inlet check valve 244 above atmospheric, a higher counterbalance pressure may be built up in the reservoir cavity 256 of the embodiment shown in FIG. 10 than can be achieved with the embodiments of FIG. 8 and FIG. 9 in which the pressure upstream of the inlet check valve 244 is limited to atmospheric pressure. It will also be appreciated that the pressure generated in the pumping cavity 258 will contribute to the counterbalance effect and be transmitted through the rod 252 of the pumping cylinder 248 to the upper crossbar 212. As a practical matter, with the arrangement shown in FIG. 10 it may take several strokes of the CRP apparatus 200, or a rocking action as described above, to allow the pressure between the piston 242 and the check valve 244 at the bottom of the pump stroke 206 to "bootstrap" up to a maximum working value.

As shown in FIG. 10, it may be desirable to add an air tank 260 at an appropriate position within a pneumatic counterbalance arrangement according to the invention, in order to improve operation. It may also be advantageous to provide some form of pressure gage or sensor 262 at an appropriate location for monitoring and controlling operating pressures in the reservoir cavity 256, the pumping cavity 258, and the cavity between the piston 242 and the outlet check valve 246 using a controller 264. It will be recognized that the controller 264 may take any appropriate form, including manual or automatic controls.

Figure 11:
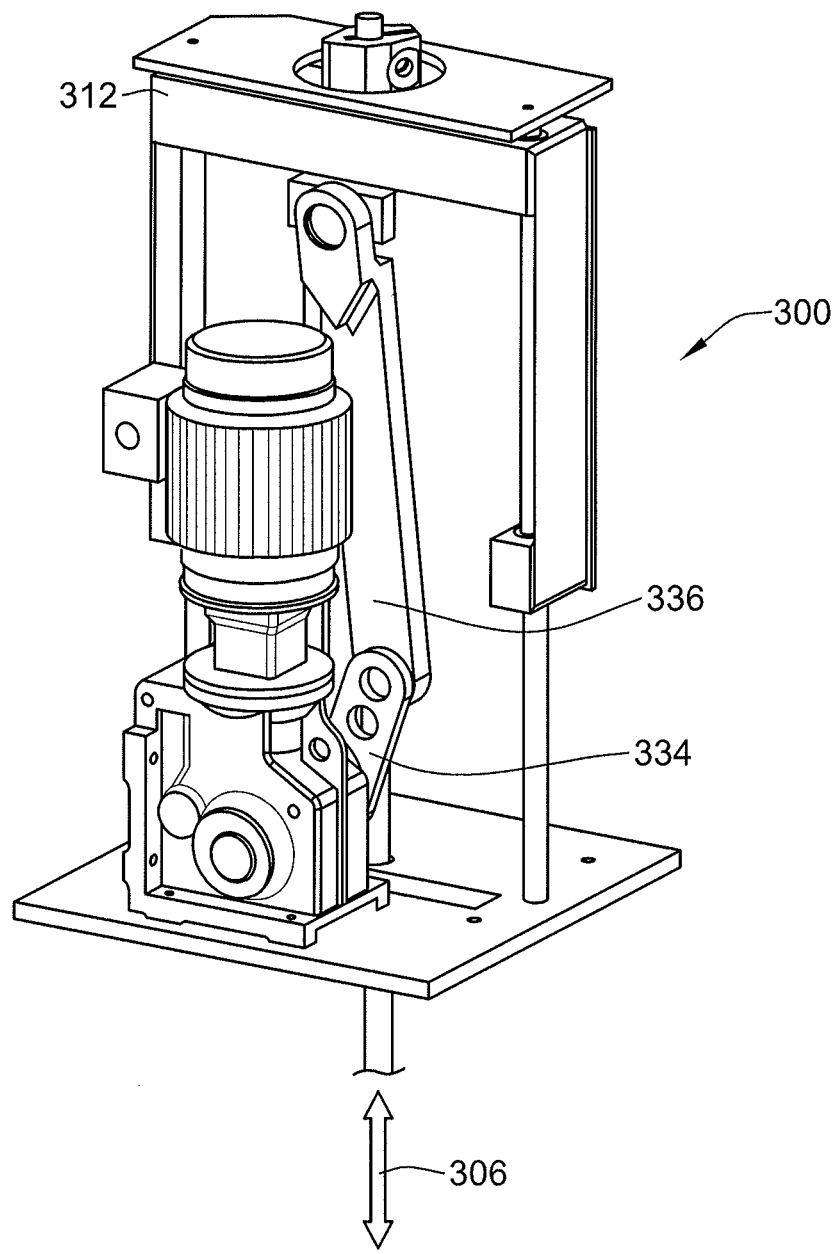
FIGS. 11-13 are perspective illustrations of a third exemplary embodiment of a cranked rod pump apparatus, according to the invention.
Figure 12:
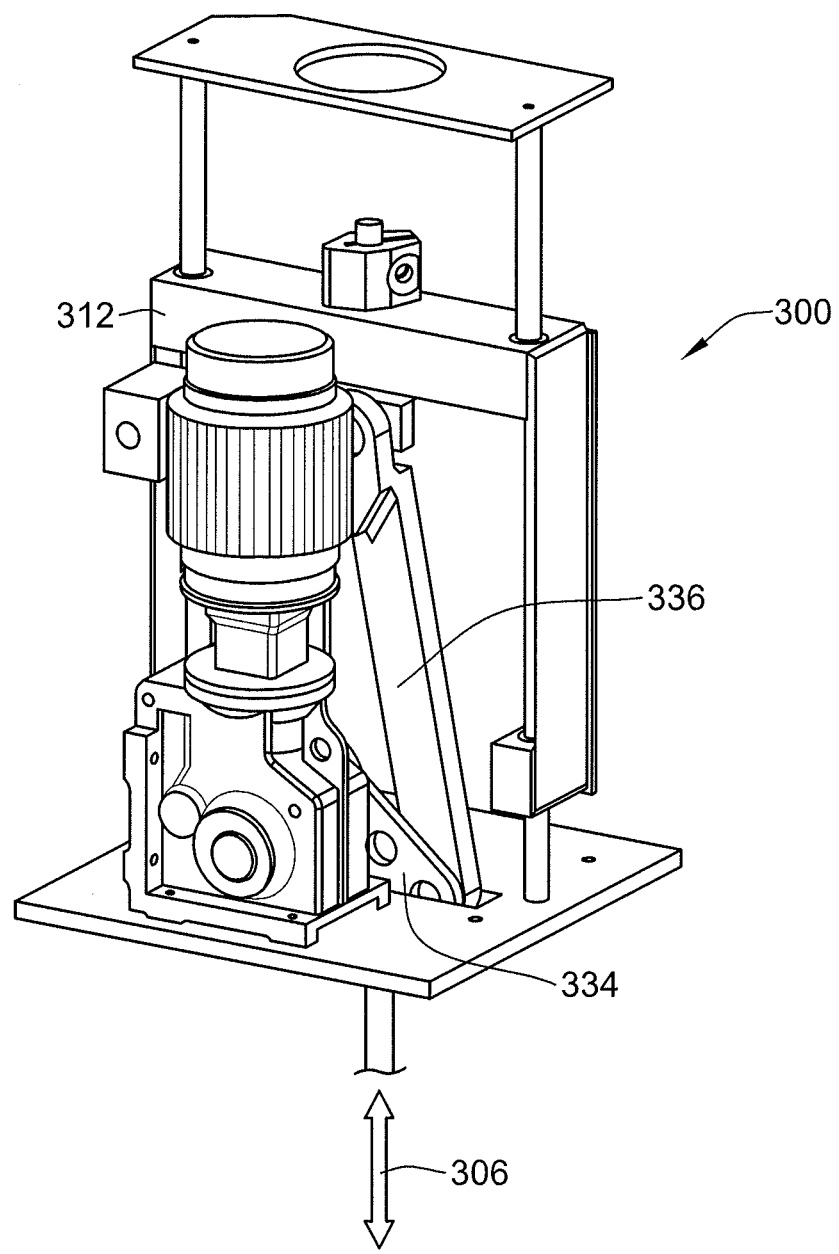
Figure 13:
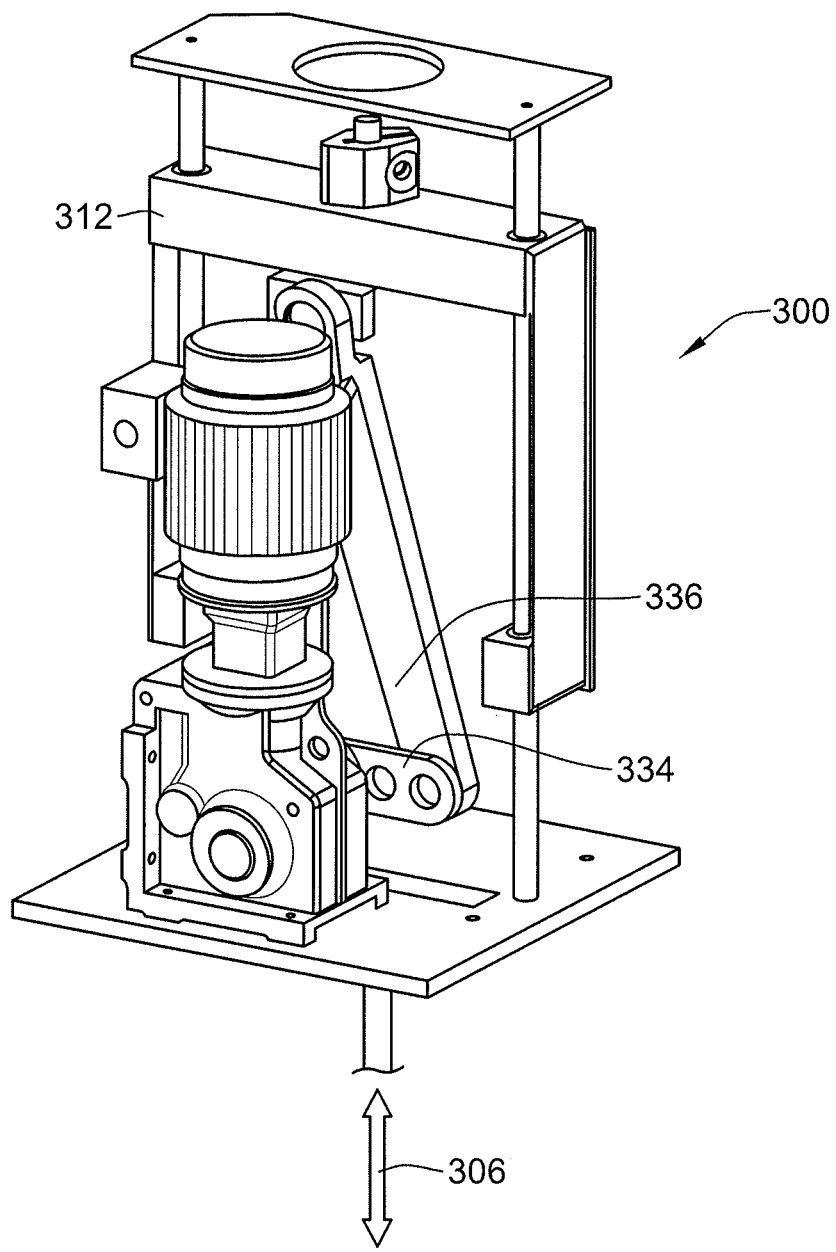

FIGS. 11-13 illustrate a third exemplary embodiment of a CRP apparatus 300, in accordance with the invention. The third exemplary embodiment of the CRP apparatus 300 is substantially identical to the second exemplary embodiment of the CRP apparatus 200, described above, with the exception that the third exemplary embodiment of the CRP apparatus 300 does not include a pneumatic counterbalance arrangement. FIGS. 11-13 illustrate an upper crossbar 312, an articulating link element 336, and a crank element 334 of the third exemplary embodiment of the CRP apparatus 300 in different positions during a pump stroke 306.

FIGS. 14-16 illustrate a fourth exemplary embodiment of a CRP apparatus 400, according to the invention. The construction of the fourth exemplary embodiment of the CRP apparatus 400 is similar in most respects to the embodiments described hereinabove. The primary difference between the fourth exemplary embodiment 400 and the previous exemplary embodiments lies in mounting the motor 416 and right angle gear box 420 on top of the upper frame cross member 430 of the frame 418, rather than mounting the motor and gear box 216 and 226 to the base 220 of the frame 218 in the second and third exemplary embodiments of the CRP apparatus 200, 300. FIGS. 14-16 show a vertically moveable member 410, a crank element 434 and an articulating link element 436 of the CRP apparatus 400 in several different positions during a pump stroke 406.

Figures 18, 19:
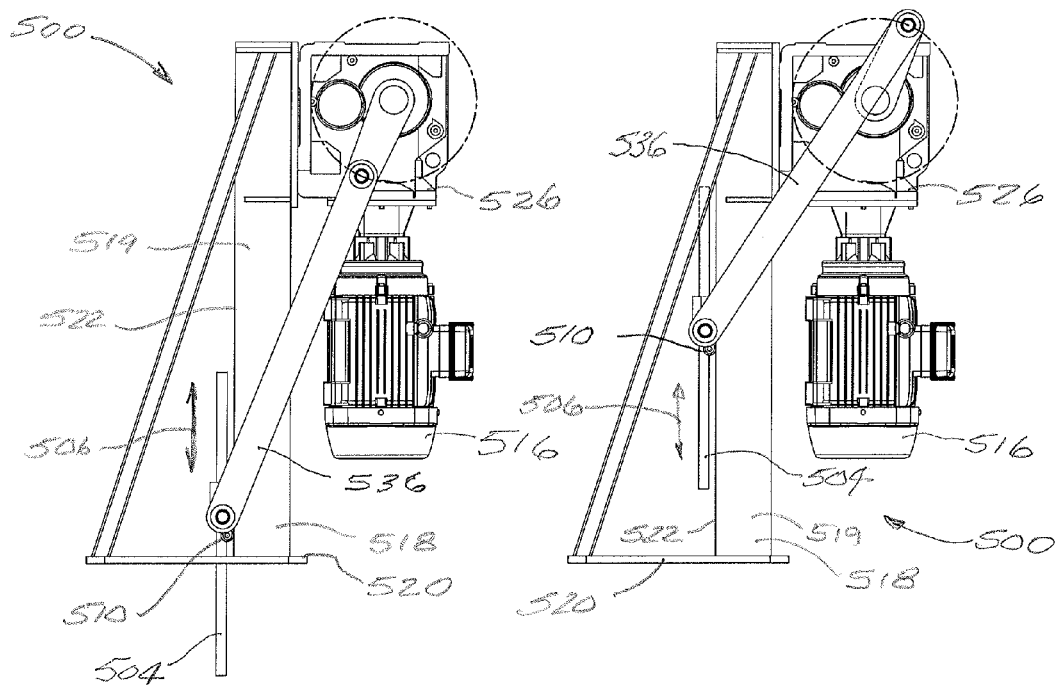
FIGS. 18 and 19 are side views of the fifth exemplary embodiment of a cranked rod pumping apparatus shown in FIG. 17, with FIGS. 18 and 19 showing elements of the cranked rod pump in two different positions during a cranking cycle of the cranked rod pump, according to the invention.
Figure 17:
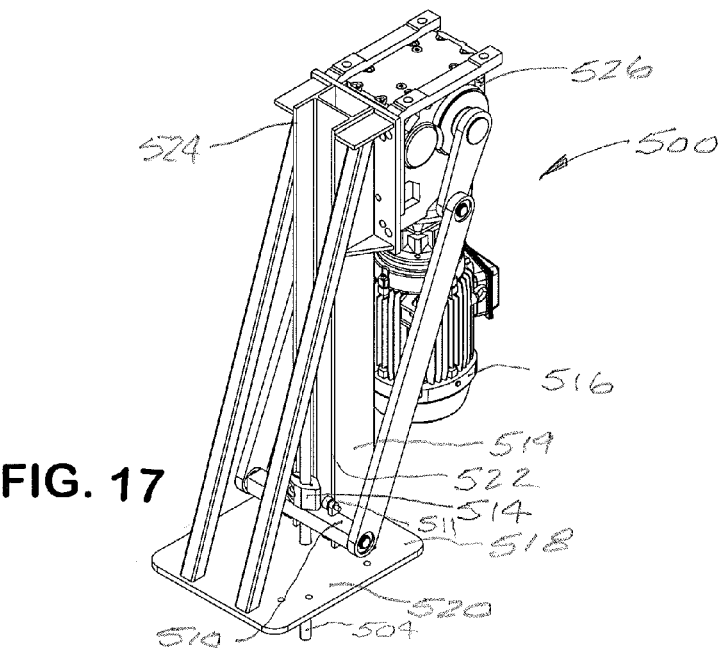
FIG. 17 is a perspective illustration of a fifth exemplary embodiment of a cranked rod pumping apparatus, according to the invention.

FIGS. 17-19 illustrate a fifth exemplary embodiment of a CRP apparatus 500, according to the invention. The construction of the fifth exemplary embodiment of the CRP apparatus 500 is similar in many respects to the other embodiments of CRP apparatuses described hereinabove. The primary difference between the fifth exemplary embodiment 500 and the previous exemplary embodiments lies in mounting the motor 516 and right angle gear box 526 on one side of a vertical guide rail member 519, of the frame 518, having one or more linear guide rails 522, 524 on an opposite side of the guide rail member 519 from the motor 516 and gearbox 526 for guiding a vertically movable member 510 along the linear guide rails 522, 524. The vertically movable member 510 is operatively connected by a crank element 534 and an articulating link element 536 and the right angle gearbox 520 to a rotatable element of the motor 516, in the form of a motor output shaft (not shown). By virtue of this arrangement, the rotatable element of the motor 516 and the vertically movable member 510 are operatively connected in a fixed relationship to one another.

FIGS. 18 and 19 respectively show the vertically moveable member 510, at the low end and the high end of a pump stroke 506 of the CRP apparatus 500. The respective lengths of the crank element 534 and an articulating link element 536 of the CRP apparatus, and the vertical location of the right angle gearbox 526 above a base 520 of the frame 518 are cooperatively selected so that the vertically movable member 510 will always hang below the upper end of the articulating link 536 in any angular position of the crank element 534, during operation of the CRP apparatus 500. As a result having the vertically movable member 510 always hang below the upper end of the articulating link 536 in any angular position of the crank element 534, in combination with positioning the gearbox 526 and vertically movable member 510 on opposite sides of the vertical guide rail member 519, gravitational forces will cause the vertically movable member 510 to be slidingly held in contact with the linear guide rails 522, 524 of the vertical guide rail member 519, as the motor 516 is controlled to impart reciprocating motion to the vertically movable member 510 along the linear guide rails 522, 524.

As best seen in FIG. 17, the pump rod 504 extends slidingly through and is secured to the vertically movable member 510 in the exemplary embodiment of the CRP apparatus by a clamp 514 located above the vertically movable member 510, in the same manner as described above in relation to other embodiments of the invention. As further shown in FIG. 17, the vertically movable member 520 of the CRP apparatus 500 includes bearing arrangements, roller bearing arrangements 511, for reducing frictional contact of the vertically movable member 510 with the linear guide rails 522, 524.

It will be understood that a pneumatic counterbalance arrangement, according to the invention may also be used in a CRP apparatus similar to the fifth exemplary embodiment of the invention, in other embodiments of the invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cranked rod pumping (CRP) apparatus, for imparting reciprocating substantially vertical motion to a polished rod of a sucker-rod pump having a pump stroke, the CRP apparatus comprising:

a cranked mechanical actuator arrangement, having a substantially vertically movable member attached to the rod of the sucker-rod pump for imparting and controlling vertical motion of the rod of the sucker-rod pump, the cranked mechanical actuator arrangement further includes, a frame, a crank element and an articulating link element such that the frame has a base thereof adapted for attachment to the wellhead of a well, and having one or more linear guide rails extending vertically upwardly from the base when the base is attached to the wellhead, with the vertically movable member being slidably mounted on the linear guides and constrained by the guides for substantially linear reciprocating vertical movement along the linear guide rails; and a motor having a right angle gear box with a rotatable element thereof operatively connected to the substantially vertically movable member of the linear mechanical actuator arrangement in a manner establishing a fixed relationship between the rotational position of the rotatable element of the motor and the vertical movement of the vertically movable member, with the crank element being operatively coupled at a first attachment point thereof to the rotatable element of the motor for rotation in a fixed drive ratio with the rotatable element of the motor, with the motor being disposed on one side of the one or more linear guide rails above the base of the frame, and the vertically movable member being slidingly disposed on an opposite side of the one or more linear guide rails;

the articulating link element has first and second attachment points thereof disposed at a spaced relationship from one another along the articulating link element, with the first attachment point of the articulating link element being pivotably joined to the crank element at a second attachment point of the cranked element spaced eccentrically radially outward from the first attachment point of the cranked element with the second attachment point of the articulating link element being pivotably attached to the vertically movable member, with the crank element and the articulating link element having respective lengths of the CRP apparatus, and the vertical location of the first attachment point of the crank element above the base of the frame being cooperatively selected so that the vertically movable member is constrained to always hang below the first attachment point of the articulating link in any angular position of the crank element during operation of the CRP apparatus, in such a manner that gravitational force will cause the vertically movable member to be slidingly held in contact with the one or more linear guide rails as the motor is controlled to impart reciprocating motion to the vertically movable member along the one or more linear guide rails.

2. The CRP apparatus of claim 1, further comprising, a motor drive and controller for operating the motor in a substantially constant input power operational mode.

3. The CRP apparatus of claim 2, wherein, the CRP apparatus includes substantially no electrical power storage elements.

4. The CRP apparatus of claim 2, wherein, the CRP apparatus includes substantially no power storage elements.

5. The CRP apparatus of claim 1, wherein, the CRP apparatus includes a solar energy power source operatively attached for providing some or all of the power for driving the motor.

6. The CRP apparatus of claim 5, wherein, the CRP solar energy power source is the sole source of power for driving the motor, such that the CRP apparatus only pumps when the solar energy power source is producing sufficient power to drive the motor.

7. The CRP apparatus of claim 1, wherein, cranked rod mechanical actuator further comprises a pneumatic counterbalance arrangement operatively connected between the frame and the vertically movable member.

8. The CRP apparatus of claim 7, wherein, the pneumatic counterbalance arrangement comprises, at least one pneumatic cylinder operatively connected between the frame and the vertically movable member for storing energy during a portion of the downward stroke of the vertically movable member, and for releasing the stored energy during a portion of a subsequent upward stroke of the vertically movable member.

9. The CRP apparatus of claim 8, wherein, the at least one pneumatic cylinder is disposed between the vertically movable member and the base.

10. The CRP apparatus of claim 1, wherein, at least one of the cranked element and the articulating link element further comprises an additional attachment point, for changing the stroke of the vertically movable member along the guides, to thereby change the pump stroke.

11. The CRP apparatus of claim 1, wherein, the cranked rod mechanical actuator further comprises a drive arrangement operatively connected between the rotatable element of the motor and the first attachment point of the crank element.

* * * * *